April 8, 1924.
C. JESSEE
DEHORNING APPARATUS
Filed March 16, 1920
1,490,077
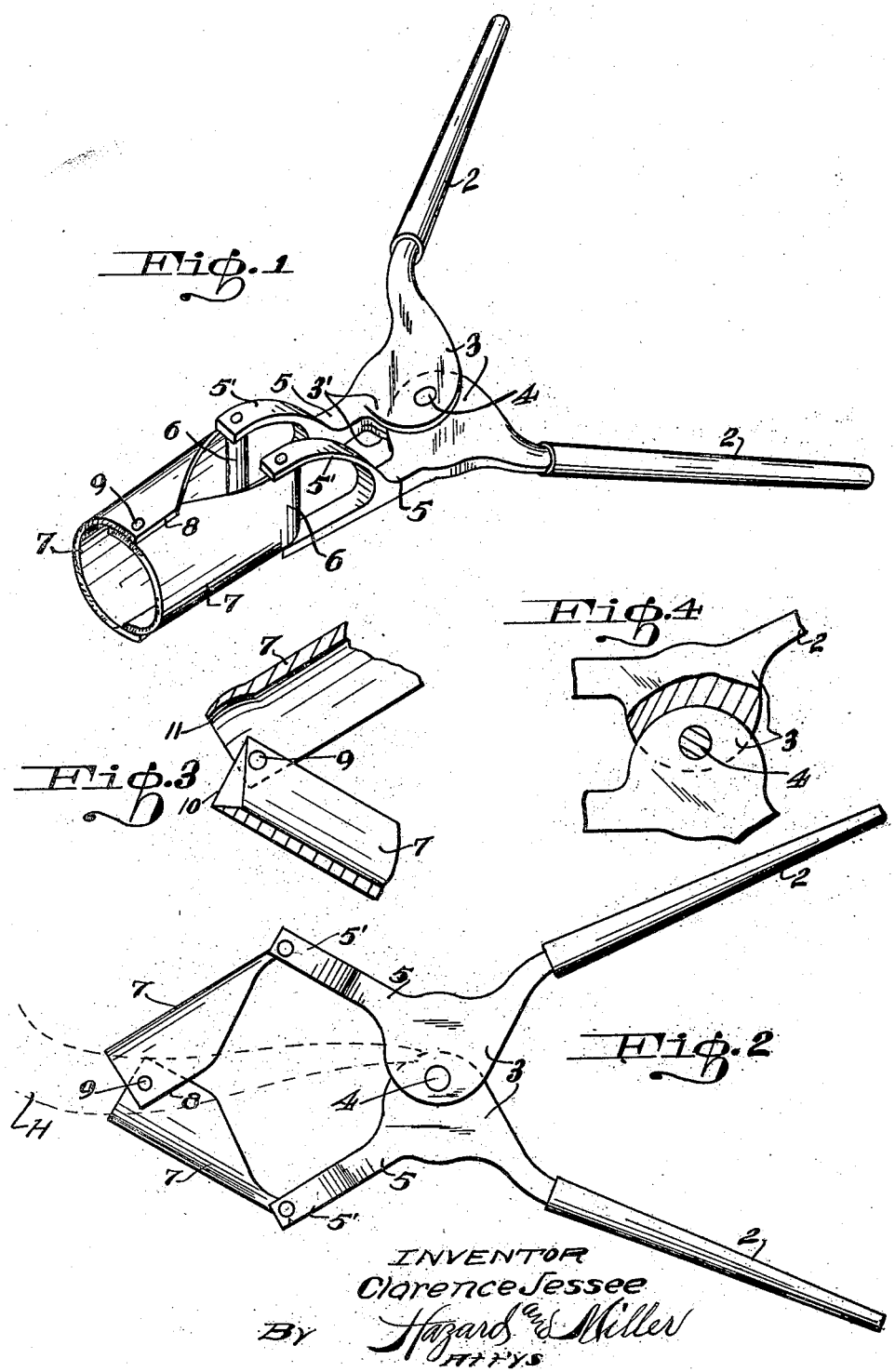
INVENTOR
Clarence Jessee
BY Hazard & Miller
Attys Patented Apr. 8, 1924.

1,490,077

UNITED STATES PATENT OFFICE.

CLARENCE JESSEE, OF LOMPOC, CALIFORNIA.

DEHORNING APPARATUS.

Application filed March 16, 1920. Serial No. 366,333.

*To all whom it may concern:*

Be it known that I, CLARENCE JESSEE, a citizen of the United States, residing at Lompoc, in the county of Santa Barbara and State of California, have invented new and useful Improvements in Dehorning Apparatus, of which the following is a specification.

This invention relates to devices for dehorning cattle and has for an object to provide a device of this kind that is extremely powerful; that is simple, and that is quickly applied and easily operated to secure the severing of the horns and the invention consists of the construction, the combination, and in details and arrangements of parts, an embodiment of which invention is illustrated in the accompanying drawings and described and claimed hereinafter.

Figure 1 is a perspective of the tool with the cutters in open position.

Figure 2 is a plane view showng the cutters in the closed position.

Figure 3 is a sectional view through the cutting ends of the cutters.

Figure 4 is a detail sectional view of the pivoted hubs of the main levers.

The improved tool comprises a pair of efficiently long and substantial handle arms 2 with overlapping flat hub portions 3 through which is passed a pivot member 4. As shown in Fig. 1, one of the hub portions 3 of a lever is formed of upper and lower plates 3' between which the opposite hub 3 of the other handle 2 is inserted and this provides for an efficient guide and steadying connection between the levers and holding them against play angularly to the axis of the pivot 4.

The hub portions have tangentially extending arms 5—5 in the plane of the disc like hubs. Each of the arms 5—5, which lie in a common plane, have laterally extending and curved arms 5' spaced a sufficient distance to receive transversely extending bearing parts 6—6 that form portions of semi-cylindrical cutting members 7—7 that have overlapping longitudinal edges 8 through which are passed short pivots 9 on each side of the cylindrical cutting means formed by the connected semi-cylindrical members 7—7. The arms 5 with their side parts 5' are designed to be swung away from each other to move the bearing ends and the pivoted ends 6—6 apart and thus to rotate the outer ends of the members 7—7 about the diametrical axis of the pivots 9 and cause the semi-circular and sharpened edges 10 and 11, Fig. 3, to move together and thus sever an interposed horn H, Fig. 2.

The edge 11 of one cutter member 7 is shown in Fig. 3 as rounded on the inner curve concentric to the axis of the pivots 9 and the opposite edge 10 of the other cutter is designed to move into shearing relation to the edge 11 the edges forming a curved mouth approximating the curvature of the body of the horn.

By the construction and arrangement of the parts as above described the axis of the cutters 7—7 passes above the plane of the hubs 3—3 so that an engaged horn may project without interference over the hubs and thus the device is rendered readily applicable to horns of different length and different diameter and permits the cutting of the horn at any desired point. After the tool has been applied so that the cutters embrace a horn the handles 2—2 are forced toward each other to swing the cutting members 7, 7 upon their pivots 9 and as a result, the cutting edges 10 and 11 are caused to move toward and past each other to cleanly and quickly sever the engaged horn. By virtue of the relative arrangement of the points of pivotal connection 4, 6 and 9, the cutting edges of the members 7 may be brought together so as to exert powerful pressure on the horn when the same is severed.

Various changes may be made without departing from the spirit of my invention as claimed.

What is claimed is:

1. A dehorning tool comprising a pair of levers movable toward each other about a common axis; and a pair of cooperative cutting members pivotally connected to said levers and to each other, said cutting members being shaped so as to form a substantially tubular member that is adapted to embrace a horn and said cutting members being arranged wholly to one side of the plane of the handles so that an engaged horn may extend across the axis of the pivoted handles.

2. A dehorning tool comprising a pair of pivoted handles wth forked arms extending beyond the pivots; and pivotally connected cutting members whose cutting edges form a circular mouth and which cutting members are pivotally connected to the arms of the levers.

3. A dehorning tool comprising a pair of pivoted handles with forked arms extending beyond the pivots and arranged to one side of the plane in which the handles swing; and pivotally connected cutting members whose cutting edges form a circular mouth and which members are pivotally connected to the arms of the levers.

4. A dehorning tool comprising a pair of pivoted levers with arms operating when the handles of the levers are moved together; and a pair of semi-cylindrical cutters pivoted together on a diametrical axis and having a pivotal connection with the lever arms so that as the lever arms open the cutting edges of the cutters move toward each other.

5. A dehorning tool comprising a pair of pivoted handles having arms extending beyond the pivots and arranged at one side of the plane in which the handles swing, and pivotally connected cutting members whose cutting edges form a circular mouth and which cutting members are pivotally connected to the arms and levers.

In testimony whereof I have signed my name to this specification.

CLARENCE JESSEE.